US006558730B1

(12) United States Patent
Gisaw et al.

(10) Patent No.: US 6,558,730 B1
(45) Date of Patent: *May 6, 2003

(54) POTATO-BASED FABRICATED SNACKS MADE FROM CONTINUOUSLY SHEETED DOUGHS AND METHODS FOR CONTROLLING THE TEXTURE AND ORGANOLEPTICAL PROPERTIES THEREOF

(75) Inventors: Yonas Gisaw, Fairfield, OH (US); Thomas Northrup Asquith, Cincinnati, OH (US); Oiki Sylvia Lai, Cincinnati, OH (US); Maria Dolores Villagran, West Chester, OH (US); Brandi R. Cole, Fairfield, OH (US)

(73) Assignee: The Procter & Gamble Co., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/001,455

(22) Filed: Dec. 31, 1997

Related U.S. Application Data

(63) Continuation-in-part of application No. 08/886,630, filed on Jul. 1, 1997, now Pat. No. 6,432,465.

(51) Int. Cl.⁷ .............................................. A23L 1/216
(52) U.S. Cl. ...................... 426/637; 426/438; 426/439; 426/560; 426/808
(58) Field of Search ................................ 426/560, 637, 426/510, 512, 808, 439, 438, 550

(56) References Cited

U.S. PATENT DOCUMENTS

| 2,787,553 | A | 4/1957 | Cording et al. ................ 99/207 |
| 3,054,683 | A | 9/1962 | Hendel et al. ................. 99/207 |
| 3,355,304 | A | 11/1967 | Barnes et al. ................. 99/207 |
| 3,399,062 | A | 8/1968 | Willard, Jr. et al. |
| 3,468,673 | A | 9/1969 | Keller |
| 3,501,315 | A | 3/1970 | Slakis et al. |
| 3,594,187 | A | 7/1971 | Liepa et al. .................. 99/100 |
| 3,619,211 | A | 11/1971 | Chang et al. |
| 3,626,466 | A | 12/1971 | Alexander .................... 107/15 |
| 3,666,494 | A | 5/1972 | Bentz et al. |
| 3,666,511 | A | 5/1972 | Williams et al. |
| 3,687,679 | A | 8/1972 | Sijbring |
| 3,767,427 | A | 10/1973 | Chang et al. |
| 3,772,039 | A | 11/1973 | Guadagni et al. |
| 3,814,818 | A | 6/1974 | Chang et al. |
| 3,829,582 | A | 8/1974 | Guadagni et al. |
| 3,857,982 | A | 12/1974 | Sevenants |
| 3,899,602 | A | 8/1975 | Rutenberg et al. |
| 3,975,549 | A | 8/1976 | Shatila et al. |
| 3,977,897 | A | 8/1976 | Wurzburg et al. |
| 3,987,210 | A | 10/1976 | Cremer |
| 3,988,484 | A | 10/1976 | Shaitla |
| 4,017,460 | A | 4/1977 | Tessler |
| 4,048,435 | A | 9/1977 | Rutenberg et al. |
| 4,098,997 | A | 7/1978 | Tessler |
| 4,107,345 | A | 8/1978 | MacDonald et al. |
| 4,112,222 | A | 9/1978 | Jarowenko |
| 4,167,588 | A | 9/1979 | Willard |
| 4,207,355 | A | 6/1980 | Chiu et al. |
| 4,229,489 | A | 10/1980 | Chiu et al. |
| 4,241,094 | A | 12/1980 | O'Neil et al. ................ 426/324 |
| 4,263,332 | A | 4/1981 | Withycombe et al. |
| 4,293,582 | A | * 10/1981 | Hamann et al. ............ 426/637 |
| 4,391,836 | A | 7/1983 | Chiu |
| 4,428,972 | A | 1/1984 | Wurzburg et al. |
| 4,455,321 | A | 6/1984 | Glabe et al. |
| 4,526,800 | A | 7/1985 | Howard |
| 4,645,679 | A | 2/1987 | Lee, III et al. |
| 4,668,519 | A | 5/1987 | Dartey et al. ................ 426/548 |
| 4,678,672 | A | 7/1987 | Dartey et al. .................. 426/19 |
| 4,698,230 | A | 10/1987 | Willard |
| 4,770,891 | A | 9/1988 | Willard ....................... 426/559 |
| 4,781,937 | A | 11/1988 | Knowles et al. ............ 426/457 |

(List continued on next page.)

FOREIGN PATENT DOCUMENTS

| CA | 871648 | 5/1971 |
| EP | 0 320 057 | 6/1989 |
| EP | 418955 A2 | 3/1991 |
| GB | 608996 | 9/1948 |
| GB | 1194421 | 6/1970 |
| GB | 1232497 | 5/1971 |
| WO | 94/23591 | 10/1994 |
| WO | WO 95/05090 | 8/1995 |
| WO | 96/01572 | 1/1996 |
| WO | 97/25880 | 7/1997 |
| WO | 98/00036 | 1/1998 |
| WO | 98/00037 | 1/1998 |
| WO | WO 99/20112 | 8/1999 |

OTHER PUBLICATIONS

US 6,294,208, 9/2001, Neel (withdrawn)
Owen Fennema, "Food Chemistry", 1996, pp. 201–204.*
Lineback, David R., Ph.D., "Food Carbohydrates", Basic Symposium Series, Starch Derivatives And Their Use In Foods, 1982, pp. 254–255, The AVI Publishing Company, Inc., Westport, Connecticut.

* cited by examiner

Primary Examiner—Lien Tran
(74) Attorney, Agent, or Firm—Karen F. Clark; Melody A. Jones

(57) ABSTRACT

Fabricated snacks produced from doughs comprising (1) a potato-based flour component, (2) one or more polysaccharides selected from the group consisting of non-potato-based flour, starch, gum, or mixtures thereof, and (3) water are disclosed. The doughs are cohesive, non-adhesive, and sheetable, and the fabricated snacks produced therefrom have desired expansion, crispness, and mouthmelt.

24 Claims, No Drawings

U.S. PATENT DOCUMENTS

| | | | |
|---|---|---|---|
| 4,876,102 A | * 10/1989 | Feeney et al. | 426/550 |
| 4,889,730 A | 12/1989 | Roberts et al. | |
| 4,938,982 A | 7/1990 | Howard | |
| 4,970,084 A | 11/1990 | Pirrotta et al. | 426/289 |
| 4,970,086 A | 11/1990 | Best | |
| 4,973,481 A | 11/1990 | Hunt et al. | 426/144 |
| 5,045,335 A | 9/1991 | De Rooij et al. | |
| 5,063,072 A | 11/1991 | Gillmore et al. | |
| 5,085,884 A | 2/1992 | Young et al. | |
| 5,093,146 A | 3/1992 | Calandro et al. | 426/619 |
| 5,104,673 A | 4/1992 | Fazzolare et al. | 426/549 |
| 5,171,600 A | 12/1992 | Young et al. | 426/550 |
| 5,188,859 A | 2/1993 | Lodge et al. | 426/560 |
| 5,268,187 A | 12/1993 | Quinlan | |
| 5,281,276 A | 1/1994 | Chiu et al. | |
| 5,281,432 A | 1/1994 | Zallie et al. | |
| 5,292,542 A | 3/1994 | Beck et al. | 426/285 |
| 5,340,598 A | 8/1994 | Hay et al. | 426/496 |
| 5,362,511 A | 11/1994 | Villagran et al. | |
| 5,366,748 A | * 11/1994 | Villagran et al. | 426/549 |
| 5,366,749 A | 11/1994 | Frazee et al. | |
| 5,366,755 A | 11/1994 | Timonen et al. | |
| 5,405,625 A | 4/1995 | Biggs | 426/93 |
| 5,409,542 A | 4/1995 | Henley et al. | |
| 5,429,834 A | 7/1995 | Addesso et al. | 426/549 |
| 5,433,961 A | 7/1995 | Lanner et al. | 426/93 |
| 5,435,851 A | 7/1995 | Kasica et al. | |
| 5,458,910 A | 10/1995 | Gruetzmacher et al. | 426/611 |
| 5,464,642 A | 11/1995 | Villagran et al. | 426/439 |
| 5,464,643 A | 11/1995 | Lodge | 426/439 |
| 5,470,600 A | 11/1995 | Petelle et al. | |
| 5,500,240 A | 3/1996 | Addesso et al. | 426/560 |
| 5,514,387 A | 5/1996 | Zimmerman et al. | 426/74 |
| 5,514,404 A | 5/1996 | Zimmerman et al. | 426/549 |
| 5,525,368 A | 6/1996 | Rha et al. | |
| 5,593,503 A | 1/1997 | Shi et al. | |
| 5,629,416 A | 5/1997 | Neigel et al. | |
| 5,643,627 A | 7/1997 | Huang et al. | |
| 5,695,804 A | 12/1997 | Hnat et al. | |
| 5,718,770 A | 2/1998 | Shah et al. | |
| 5,720,822 A | 2/1998 | Jeffcoat et al. | |
| 5,725,676 A | 3/1998 | Chiu et al. | |
| 5,747,092 A | 5/1998 | Carey et al. | 426/560 |
| 5,846,786 A | 12/1998 | Senkeleski et al. | |
| 5,902,410 A | 5/1999 | Chiu et al. | |
| 5,904,940 A | 5/1999 | Senkeleski et al. | |
| 5,932,017 A | 8/1999 | Chiu et al. | |
| 5,954,883 A | 9/1999 | Nagle et al. | |
| 6,010,574 A | 1/2000 | Jeffcoat et al. | |
| 6,022,574 A | * 2/2000 | Lanner et al. | 426/808 |
| 6,054,302 A | 4/2000 | Shi et al. | |

POTATO-BASED FABRICATED SNACKS MADE FROM CONTINUOUSLY SHEETED DOUGHS AND METHODS FOR CONTROLLING THE TEXTURE AND ORGANOLEPTICAL PROPERTIES THEREOF

CROSS REFERENCE TO RELATED APPLICATIONS

This application claims the benefit of priority to U.S. application Ser. No. 08/886,630, filed Jul. 1, 1997, still pending, which was a combination of U.S. Provisional Application No. 60/020,934 filed Jul. 1, 1996 and U.S. Provisional Application No. 60/020,937 filed Jul. 1, 1996.

This application is a CIP of Ser. No. 08/886,630 filed Jul. 1, 1997 now U.S. Pat. No. 6,432,465.

TECHNICAL FIELD

The present invention relates to a method for selectively controlling the texture, flavor display and mouthmelt (i.e., organoleptical properties) of potato-based fabricated snacks. The present invention further relates to dough compositions from which the potato-based fabricated snacks are made.

BACKGROUND OF THE INVENTION

It is quite common to include starch-based materials in the dough compositions of fabricated snacks. Typically, ingredients such as dried potato products are used in combination with a high amylopectin and/or pregelatinized starch. The high amylopectin starch and/or pregelatinized starch is used to provide a dough having desired performance properties (e.g., cohesive, non-adhesive, continuously sheetable) while at the same time provide a dough which produces an acceptable snack when fried.

Acceptability of the organoleptical properties of fabricated snacks relies more upon the perceptions of the consumer than on properties that can be measured quantitatively. For example, crispness, crunchiness, and mouthmelt are not easily quantified, but have significant impact on consumer acceptance. Since many of the properties of fabricated snacks are influenced by the composition of the dough, it would be desirable to develop methods for selectively controlling the organoleptical properties of the snack through formulation.

Although all of the factors contributing to the organoleptical properties of the snack are not well understood, it is known that changes in the dough's composition and variability of the same ingredient (i.e., from lot to lot), can result in significant changes in the visco-elastic properties of the dough and the organoleptical properties of the fried snack.

Fabricated snacks, such as potato chips or potato crisps, generally comprise ingredients such as potato flour, potato flakes, potato granules mixed with water, and various other dry ingredients. The dry ingredients may include starches in powder, granule or flake form. The starch is used as a binder for the dough and as a means to control expansion of the dough during flying.

Combinations of ungelatinized and pregelatinized starches have been the most common starches used to control the expansion of sheetable doughs in the past, but such use has been for the purpose of expansable doughs having relatively low solids (e.g. <60%). Further, use of these starches typically requires special equipment (e.g., dockering equipment, restraining molds) in order to control expansion and/or requires special steps (e.g., forming premixes, hydrating the pregelatinized starch first) in order to form a cohesive dough.

Other starches have also been suggested for use in sheeted dough compositions. However, one problem with incorporating various starches in the dough compositions has been the inability to control the final texture of the product. This is because the ingredients used may have different properties which will affect the organoleptical properties as well as the internal structure of the finished product. For example, starches that have different water absorption indexes, degrees of gelatinization or modification will cause structural variations in the products containing that starch ingredient. Other problems have been determining: (1) the effect of these starches on the visco-elastic properties of the dough; (2) the conditions necessary to process the dough due to ingredient changes; and (3) the influence the ingredients will have on the texture of the resulting snack.

Prior approaches of trial and error, or mix-and-test, have been ineffective in providing a reliable method for selectively controlling the texture of the final snack, primarily because there is an enormous number of different materials available for use in a sheeted dough. Prior approaches have also been ineffective in providing dough compositions wherein the visco-elastic properties of the dough are controlled through formulation such that expansion of the dough is controlled and the dough is continuously sheetable.

Accordingly, it is desirable to provide a reliable method for selectively controlling the organoleptical properties of fabricated snacks made from continuously sheetable dough. It is also desirable to provide dough compositions wherein the properties of the dough are selectively controlled through formulation.

SUMMARY OF THE INVENTION

The present invention relates to dough compositions and to a method for selectively controlling the organoleptical properties of fabricated snacks. The texture and flavor release of the snack are controlled by incorporating different ingredients having various properties into the dough. By varying the relative amounts and types of ingredients the (1) visco-elastic properties of the dough, (2) amount of expansion that occurs in the dough during frying, (3) rate of water release during frying, (4) internal structure of the finished snack, (5) rate of flavor release from the finished snack, and (6) rate of hydration and dissolution of the finished snack in the mouth, can be selectively controlled. The composition of the dough (i.e., choice of ingredients) is important with regard to obtaining fabricated snacks having a range of textures and flavor profiles.

In accordance with the method of the present invention, (1) flour, flakes and/or granules, (2) water, and (3) one or more polysaccharides selected from the group consisting of non-potato flour, starches and/or gums are combined. The relative proportions of these ingredients having various properties are adjusted when formulating the dough composition.

Depending on the properties of the ingredients employed, the process of dough expansion, water/steam release, gelatinization and/or setting of the starch can be coordinated such that the desired structure can be obtained. By selectively combining the ingredients, based on their properties (water absorption index, gelatinization temperature, rate of viscosity development, peak viscosity, rate of viscosity breakdown, viscosity during cooling, etc.) one may selectively formulate dough compositions having the desired properties, and hence, formulate snacks wherein the final texture is selectively controlled.

The major components used to selectively control the organoleptical properties of the fabricated snacks, while at the same time provide a dough that is cohesive, non-adhesive, and sheetable, comprise: (1) a potato-based flour component, (2) one or more polysaccharides selected from the group consisting of non-potato-based flour, starch and/or gum, and (3) water. Particularly preferred compositions comprise (1) mainly one or more potato-based ingredients selected from potato flour, potato flakes, or potato granules and mixtures thereof, together with (2) one or more polysaccharides selected from the group consisting of starch wherein the starch is a native starch, pregelatinized and/or partially gelatinized starch, modified starch, starch hydrolyzate, gums selected from hydroxypropylcellulose, methylcellulose, hydroxypropylmethylcellulose, carboxymethylcellulose, microcrystalline cellulose and mixtures thereof, and (3) water.

In addition to the major ingredients, it is possible to further include different ingredients, for example, various emulsifiers, flavors and minerals which can impart different, yet complementary properties to the dough and final product.

Each of these ingredients imparts one or more unique properties to the doughs made therefrom as well as to the finished product made from the doughs. No one component will completely determine the organoleptical properties of the finished product or the visco-elastic properties of the dough, rather the ingredients work together in an interrelated fashion.

DETAILED DESCRIPTION

Definitions

As used herein, "sheetable" dough is a dough capable of being placed on a smooth surface and rolled to the desired final thickness without tearing or forming holes.

As used herein, "polysaccharide" refers to naturally occuring, high polymeric carbohydrates composed of anhydro-D-glucopyranosyl units, in either natural, dehydrated (e.g., flakes, granules, meal) or flour form, starches such as modified starches, native starches, and dehydrated starches, starches derived from tubers, legumes and grain, for example corn starch, wheat starch, rice starch, waxy corn starch, oat starch, cassava starch, waxy barley starch, waxy rice starch, glutenous rice starch, sweet rice starch, amioca, potato starch, tapioca starch, corn flour, masa corn flour, corn grits, corn meal, rice flour, tapioca, buckwheat flour, rice flour, oat flour, bean flour, barley flour, gum derived from plants and/or microorganisms, cellulose derivatives, and mixtures thereof.

As used herein, "Brabender Units (BU)" is an arbitrary unit of viscosity measurement roughly corresponding to centipoise.

As used herein, "modified starch" refers to starch that has been chemically and/or biologically altered to improve its functional characteristics. Suitable modified starches include, but are not limited to, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof.

As used herein, "hydrolyzed starch" or "starch hydrolyzates" refer to starch that has been depolymerized with acid and/or enzymes to provide a given degree of depolymerization (DP) as determined through dextrose equivalent (DE).

As used herein, "raw starch" refers to starch as isolated from tubers, roots, cereals and grains.

As used herein, "pregelatinized starch" refers to a starch that has been precooked or is cold water swellable.

As used herein, the term "added water" refers to water which has been added to the dry dough ingredients. Water which is inherently present in the dry dough ingredients, such as in the case of the sources of flour and starches, is not included in the added water.

All percentages are by dry weight unless otherwise specified.

Dough Preparation

Method for Selecting Ingredients

The method of the present invention for controlling the organoleptical properties of the fabricated snacks is based on formulation. More specifically, the method is based on the effect imparted by the ingredients on the microstructure of the snack in order to build into the microstructure certain desired, predetermined properties. This enables one to selectively control the expansion properties of the dough, the internal matrix of the snack, and thus, the texture of the final snack.

The number of different starches and gums for use in fabricated snacks is enormous. The compositions can comprise flour, raw starch, modified starch, cross-linked starches, raw starches, cellulose derivatives, carboxymethyl cellulose, starches having more than one treatment (e.g. pregelatinized cross-linked starch, pregelatinized cross-linked hydroxypropylated pregelatinized starches), gums and combinations of these ingredients. Within a given class, there is some commonality in properties. Pregelatinized starches, for instance, require complete mixing and can form gels upon hydration, while raw starches typically hydrate well but require heat to develop viscosity.

The method of the present invention, in its simplest form, comprises selecting ingredients based on function/properties, combining the ingredients to form a sheetable dough, measuring the rheological properties of the dough, and frying the dough. In selecting the ingredients, the water binding properties, temperature stability, rheological properties, shear resistance, and heat holding capacity are taken into consideration. With this information, the texture of the final product can be selectively controlled by varying ingredient proportions.

The visco-elastic properties of the dough are important for obtaining the desired internal structure as well as the final texture of the snack. The visco-elastic properties of the dough can also be modified by changing the ingredients such that the internal structure of the snack may have various types of interstitial voids (i.e., small or large voids, closely packed or widely dispersed voids, deep or shallow voids, irregularly shaped or uniformly shaped voids, thick or thin cell walls, etc.).

The manufacturing process (e.g., mixing, work input, sheeting) can impact the final texture since workability and dough stability play an important role in texture development. In the method of the present invention, this becomes important in that the visco-elastic properties of the dough may be modified. The present invention provides manufacturing process parameters that allow formula changes within the disclosed ranges.

From the following discussion, it will be appreciated how each of the ingredients within the dough contribute to the final texture. Specific compositions are set forth in the examples given later in order to demonstrate how the maximization of the performance of each ingredient accomplishes the combination of desired properties in the dough and in the finished product.

Control and Development of Structure

The preferred organoleptical properties of the snacks produced by the method of the present invention are formed from the interaction of the ingredients. The ingredients are combined to make a cohesive, non-adhesive, sheetable dough by thoroughly mixing the components together. The type of ingredients and quantity of ingredients to be added to the dough will depend on the desired properties of the finished product.

The internal structure, and thus the texture of the final product, is developed primarily during the cooking process. During frying, the flours, together with the starch and gums, act as water sinks to set the structure. The setting of the structure may be defined as the time in which the dough changes from a somewhat fluid-like dough comprising a high amount of mobile water (i.e., potentially removable), to a more solid, porous structure that maintains a porous structure when the snack is removed from the fryer. Therefore, the water absorption and water binding properties of the ingredients play important roles in controlling the final texture of the snack. By incorporating ingredients having various (1) water absorption/binding properties, (2) gelatinization, (3) swelling capacity, (4) heat-holding capacities, and (5) viscoelastic properties, the organoleptical properties of the snack can be varied by creating a temperature, water release and hydration gradient during frying.

While not well understood, it is believed that at least four separate mechanisms occur during frying: (1) flours, starches, and gums undergo change, resulting in the viscosity and elasticity of the dough; (2) water holding capacity of the dough is changed; (3) steam exists, creating voids; and (4) final setting of the structure results in a starch matrix having interstitial voids. The final organoleptical properties are related to the size of the voids, spatial orientation of the voids, thickness of the walls between the voids, and thermal mechanical properties of the snacks. Organoleptic properties are also controlled by the physical-chemical properties of the matrix ingredients and the orientation of the matrix ingredients. Examples of physical-chemical properties include polymer orientation (random/structured), wettability, types of interaction (water/Van Der Waals forces, salts) and binding/release of small molecules (e.g., flavor and emulsifier) to matrix polymers.

Dough Properties

The first step in the preparation of the snack comprises forming a dough having the desired visco-elastic properties such as sheet strength, tensile strength, extensibility, and reduced stickiness. Using the method for selecting ingredients described below, one skilled in the art can select the ingredients, as well as their relative concentrations, in order to obtain a sheetable dough that will result in a snack having the desired properties. Some properties considered to be generally desirable with regard to the dough are cohesiveness, non-adhesiveness, and continuous sheetability.

The amount, type, and physical properties of the ingredients in the dough composition can greatly affect the rheology and sheetability of the dough. Some ingredients which have high water absorption capacities will absorb more water, thereby reducing the amount of water available to hydrate the other ingredients. This results in a stiffer, more viscous dough.

The viscosity and rheology of the dough can also have a tremendous impact on the final texture of the snack by determining the size, number, and uniformity of the interstitial voids.

The snacks of the present invention are preferably prepared from doughs that are sheetable, elastic and extensible.

The tensile strength and sheet strength measurements characterize the rheological properties of the doughs used to prepare the snacks of the present invention.

The tensile strength measurement correlates with cohesiveness, elasticity, and extensibility of the dough. The sheet strength is a measurement that correlates with the ability of the dough to resist developing holes and/or tearing during subsequent processing steps. The tensile strength and sheet strength can be determined by techniques described herein.

The tensile strength is a measurement of the peak tension force and elastic modulus achieved prior to breaking through the dough sheet. The doughs used to prepare the snacks of the present invention preferably have a tensile strength of from about 120 gf to about 400 gf, preferably from about 140 gf to about 380 gf, and more preferably from about 160 gf to about 360 gf.

The doughs used to make the snack of the present invention mixed in a conventional low work input mixer, for example, a Hobart® or Cuisinart®, will typically have a sheet strength between about 140 gf to about 375 gf depending on whether the doughs have received low work input or higher work input. Preferably, the doughs of the present invention have a sheet strength of from about 190 gf to about 330 gf, and more preferably from about 220 gf to about 300 gf.

When doughs are produced on a commercial scale with higher work input mixers (for example, if a Turbolizer® or extruder is used) the sheet strength can be from about 1.5 times to about 2.5 times the sheet strength of the doughs produced from the low work input mixers.

When doughs having the preferred dough composition, viscoelastic properties, sheet strength and tensile strength are fried in fat, the resulting snack can have various structures (e.g., from slightly expanded to a highly expanded structure) and various textures (crisp, crunchy, soft, hard, etc.).

In addition to the above-mentioned properties, doughs comprising certain modified starches (e.g., hydroxypropylated starch) have unique properties that are beneficial in terms of sheeting. It has been observed that certain doughs of the present invention comprise a surface that is more moist and less adhesive than doughs having comparable water levels, not containing the modified starches. This reduces the wear on equipment. In addition, the product is readily removable from the belt. This allows for quick transfer of the sheeted product from belt to belt and from belt to the fryer. While not wishing to be bound by theory, it is believed that these properties are related to the composition of the dough.

Dough Compositions

The terms "dough" or "sheetable dough" have interchangeable meanings and shall refer to compositions of the present invention that can be sheeted on a continuous basis. Such doughs are characterized by comprising a flour-component, a polysaccharide selected from modified starch or gum, and water. The doughs may also include other ingredients such as processing aids, emulsifiers, flavors, vitamins, minerals and salts.

The dough compositions are relatively elastic, which makes them highly workable, sheetable and cohesive. The dough compositions comprise from about 55% to about 75% dry mix and from about 25% to about 45% added water.

Dry Mix

Potato-Based Component

An important component in the dry mix of the dough compositions of the present invention is a potato-based component. The potato-based component comprises ingredients such as potato flour, potato granules and potato flakes.

The fabricated snacks produced by the method of the present invention develop the majority of their structure from the flour component. The potato-based component not only forms most of the internal structure present in the snack upon frying (thereby forming a structural matrix) but the potato-based component also tends to affect the rheology of the dough.

The potato-based component preferably comprises from about 51% to about 95%, more preferably from about 65% to about 90%, and even more preferably about 70% to about 85%, of the dry mix. The potato ingredients are selected from the group consisting of potato flour, potato flakes, potato granules, and mixtures thereof.

Particularly preferred potato-based components comprise dehydrated potato flakes and potato granules. The preferred potato flakes comprise from about 40% to about 60% broken cells, from about 16% to about 27% amylose, from about 5% to about 10% moisture, and at least about 0.1% emulsifier. Additionally, the dehydrated flakes preferably comprise a water absorption index of from about 6.7 to about 9.5 grams of water per gram of flakes, a hot paste viscosity of from about 100 Brabender Units (BU) to about 320 BU and a cold paste viscosity of from about 100 BU to about 200 BU. From about 40% to about 60% of the dehydrated potato flakes remain on a #40 U.S. screen.

The preferred potato granules comprise from about 5.0% to about 19.0%, preferably from about 9.0% to about 16.0% amylose; from about 5.0% to about 10.0%, preferably from about 6.0% to about 8.5% moisture; and a water absorption index of from about 3 to about 7 grams of water/gram of granules, preferably from about 4.0 to about 6.0 grams of water/gram of granules.

Polysaccharide

At least 5.0% of a polysaccharide must be included in the dry mix of the dough composition of the present invention. The polysaccharide can be selected from the group consisting of non-potato based flours, starches or gums, and mixtures thereof. The polysaccharides in the dough compositions mainly reinforce and help to form the internal structure of the finished product. Different polysaccharides will impart their own unique properties to the dough and finished product and may be chosen accordingly. For example, polysaccharides that form stable gels can be added at low levels to increase the viscosity of the dough, help maintain the structure, and/or act as moisture regulating agents. The starches can be added as binders because they can physically interact with and bind significant amounts of water within the formula depending on their concentration and structure. In addition, some starches, such as waxy maize, increase the cohesiveness of the dough. Therefore, depending on the source, type and concentration of the polysaccharide, it can be used to impact the structure of the final snack or primarily to control the properties of the dough. It can be seen how the chemical make-up of the particular polysaccharide, the combination of polysaccharides, and the quantity of polysaccharides added to the dough compositions, will allow one to obtain a multitude of various textures, and also to tailor the snack formulation, with significant considerable predictability, to achieve the desired texture.

1. Non-Potato-Based Flours

Non-potato-based flours which can be used in the dry mix of the dough composition of the present invention include flours such as corn flour, masa corn flour, corn grits, corn meal, rice flour, tapioca, buckwheat flour, wheat flour, oat flour, bean flour, barley flour and mixtures thereof. Although the dough compositions may include such flours, these flours represent a smaller portion of the overall composition compared to the potato-based component. These flours will usually make up less than about 44% of the dry mix. Preferably from about 5% to about 30%, and more preferably from about 15% to about 25% non-potato-based flours can be used in the dry mix of the dough compositions of the present invention.

2. Starches

The starches suitable for use in the present invention include raw starch, pregelatinized starch and modified starch derived from tubers, legumes, cereal and grains, for example corn starch, wheat starch, rice starch, waxy corn starch, oat starch, cassava starch, waxy barley, waxy rice starch, glutenous rice starch, sweet rice starch, amioca, potato starch, tapioca starch, oat starch, cassava starch, glutenous rice, sweet rice, and mixtures thereof The starches preferably have a water absorption index of from about 0.4 to about 8 grams of water per gram of starch. More preferably, the water absorption index of the starches is lower than that of any flakes used to prepare the dough.

A. Raw Starches

Preferred raw starches include corn starch, waxy corn starch and potato starch. Raw starches can be included in the dough composition because of their ease of dispersibility and hydration, and because they can also provide a degree of binding, strength and expansion to the dough if the granules become swollen and expanded by the release of steam. The smaller linear molecules (if present) dissolve and reassociate to form a gel. For example, corn starch will gradually impart viscosity to the dough, when heated (if sufficient water is present) until it reaches a peak viscosity. A gel results after cooling. Waxy corn starch, on the other hand, increases in viscosity, reaches a peak viscosity and reduces in viscosity more rapidly than regular corn starch. On cooling, waxy corn starch (higher in amylopectin than corn starch) does not form a gel. Incorporation of the regular corn into dough formulations decreases the mouthmelt and reduces the crispness of the product, whereas incorporating the waxy corn starch increases mouthmelt and results in a product having more crispness than the product comprising the regular starch.

Raw starches may be included in the dry mix of the dough compositions up to a level of about 30%. Typically, a level of from about 2% to about 15%, preferably from about 3% to about 10%, and more preferably from about 5% to about 8% is sufficient to provide a textural and/or oganoleptical change in the final product.

B. Pregelatinized Starches

Pregelatinized starches can also be included in the dough compositions to increase the viscosity of the dough and to change the water-binding properties of the dough, among other things. Preferred pregelatinized starches are corn, waxy corn, and potato. As previously stated, one problem with incorporating pregelatinized starches is obtaining complete hydration without forming a premix. The pregelatinized starches, however, may be modified to yield various textures and viscosities. When used in the dough compositions of the present invention, the mouthmelt of the snack is increased (i.e. the snack dissolves quicker) and the snack has extended crispness. When calculating the level of gelatinized starch according to the present invention, gelatinized starch that is inherent in potato flakes or granules and flours is not included.

Pregelatinized starch may be present in the dry mix of the dough at a level up to about 15.0%. Preferably from about 2.0% to about 10.0%, more preferably from about 3.0% to about 8.0%, and most preferably from about 5.0% to about 7.0% of pregelatinized starch is used to increase crispness in the snacks of the present invention.

C. Modified Starches

Modified starches suitable for use in the dough compositions of the present invention include starch hydrolyzates, hydroxyalkylated starch, starch esters, cross-linked starch, starch acetates, starch octenyl succinate and mixtures thereof. The degree of crispness/crunchiness, mouthmelt and flavor-release of the finished product can be selectively controlled by adding starches with different degrees of modification. In addition to degree of modification, the percent amylose/amylopectin and degree of gelatinization also help control the organoleptical properties of the product by affecting the binding and release of water and matrix discontinuity. Preferably, the dry modified starches have a water absorption index of from about 0.4 to about 8.0 grams of water per gram of modified starch.

Starch hydrolyzates may be used in the dough compositions to aid in obtaining a sheetable, elastic dough. The hydrolyzed starches act to decrease the viscosity of the dough by competing with the starch for available water. It has been surprisingly found that sheetable, cohesive, low-water doughs can be prepared without the use of starch hydrolyzates. The term "hydrolyzed starch" refers to oligosaccharide-type materials that are typically obtained by acid and/or enzymatic hydrolysis of starches, preferably corn starch.

Suitable hydrolyzed starches for inclusion in the dough include maltodextrins and corn syrup solids. The hydrolyzed starches for inclusion in the dough have a Dextrose Equivalent (DE) values of from about 10 to about 36 DE, preferably from about 15 to about 30 DE, and more preferably about 18 to about 25 DE. The DE value is a measure of the reducing equivalence of the hydrolyzed starch referenced to dextrose and expressed as a percent (on a dry basis). The higher the DE value, the more reducing sugars present.

The dry mix of the dough of the present invention may comprise up to about 15.0%, preferably from about 2.0% to about 10.0%, more preferably from about 3.0% to about 8.0%, and most preferably from about 5.0% to about 7.0% starch hydrolyzate.

Hydroxyalkylated starches and starch acetates suitable for use in the dough compositions having a degree of substitution (DS) in the range of from about 0.01% to about 0.12% may be used in the dough compositions of the present invention. The low DS modifies the starch such that gelatinization temperature is lowered (compared to the raw starch), the rate of granular swelling is increased, and the tendency for the starch to gel is lowered. The hydroxyalkylated starch, when added to the dough composition, (1) increases the water holding properties of the dough, (2) decreases product density and (3) shows reduced tendencies toward gellation. The hydroxyalkylated and peracetylated starches include cross-linked hydroxyalkylated and per-acetylated starches, preferably derived from corn, waxy corn and potato.

Either or both of these starches (i.e., hydroxyalkylated, starch acetates) increase softness of the finished snack while maintaining crispness, and change the flavor display of the finished snack.

The use of starch octenylsuccinates increases the sheet strength of the dough, increases the density of the final snack and reduces mouthmelt. Incorporation of starch octenylsuccinates into the dough compositons of the present invention produces a dough that has low expansion properties.

Starch hydrolyzates, hydroxyalkylated starches, peracetylated starches and starch octenylsuccinates may be used in the dough compositions up to a level of about 15%. Preferably the starches, if used in the dry mix of the dough composition, are included at a level of from about 0.5% to about 12.0%, preferably from about 2.0% to about 10.0%, more preferably from about 3.0% to about 7%.

3. Gums

Gums may also be used in the dough compositions of the present invention. These ingredients improve the sheet strength of the dough and increase crispness and crunchiness. Gums for use in the present invention include those ingredients generally referred to as gums (cellulose derivatives) as well as plant gums. Examples of gums suitable for use in the present invention include guar gum, xanthan gum, gellan gum, carrageenan gum, gum arabic, gum tragacanth, and pectic acids having various degrees of depolymerization and degrees of methylation. Particularly preferred gums are cellulose derivatives selected from methylcellulose, hydroxypropyl methyl cellulose, carboxymethylcellulose, microcrystalline cellulose and mixtures thereof.

Gums can be used in the dry mix of the dough at a level of up to about 10%, preferably at a level of about 1.0% to about 8.0%, and more preferably at a level of about 2.0% to about 4.0%.

Added Water

The amount of water that should be added to the dry mix to obtain a dough having adequate rheology, cohesiveness and non-adhesive properties will depend on the concentration of the ingredients, the type of ingredients used, the physical properties of the ingredients, and the quantity and effectiveness of any emulsifiers and minerals present in the composition. In general, the dough compositions of the present invention comprise from about 25% to about 45% added water, preferably from about 30% to about 40%, and more preferably from about 31% to about 34%, added water. If the maltodextrin or corn syrup solids are added as a solution or syrup, the water in this syrup or solution is included as "added water". The amount of added water includes any water used to dissolve or disperse ingredients and includes water present in corn syrups, starch hydrolyzates, etc.

Emulsifiers

An ingredient that can be added to the dough compositions to aid in the processability of the dough and reduce stickiness is an emulsifier. An emulsifier may be added to directly influence the rheology of the dough. Depending on the emulsifier used, it may greatly decrease the viscosity and/or increase the workability of the dough while keeping the amount of water constant. An emulsifier can additionally be used to increase/decrease the wetability of the dry mix, change the water mobility of the dough and/or change the rate at which the water is released from the dough.

An emulsifier is preferably added to the dough composition prior to sheeting the dough. The emulsifier can be dissolved in a triglyceride fat or in a polyol fatty acid polyester, preferably a sucrose fatty acid polyester such as Olean™, available from The Procter and Gamble Company. Suitable emulsifiers include mono- and diglycerides, diacetyl tartaric acid esters and propylene glycol mono- and diesters, lecithin, and polyglycerol. Polyglycerol emulsifiers such as monoesters of polyglycerols, preferably hexapolyglycerols, can be used.

A preferred emulsifier used in the compositions of the present invention comprises a blend of mono- and diglycerides of saturated and unsaturated fatty acids. Preferably, the mono-glyceride is a distilled monoglyceride having an Iodine Value (IV) of about 60, derived from, for example, soybean oil, rapeseed oil, cottonseed oil, sunflower seed oil, palm oil, palm olein, safflower oil, corn oil, peanut oil, or mixtures thereof, and the like. The preferred distilled monoglycerides include, but are not limited to, monoglycerides derived from soybean oil, rapeseed and palm oil, or mixtures thereof, and the like.

Typical commercially available mono-glycerides contain varying amounts of di- and triglycerides. For example, distilled monodiglycerides comprise about 90% monoglyceride while monodiglycerides comprise about 30% monoglycerides. Either can be used in the dough fomulations of the present invention.

Preferred monoglycerides have an IV of about 60, preferably an IV between about 70 to about 120, more preferably an IV of from about 80 to about 110, and even more preferably an IV of from about 90 to about 100.

The level of emulsifier depends on the amount of work input that the dough will receive in subsequent processing steps. As used herein, the term "emulsifier" refers to an emulsifier which has been added to the dry dough ingredients. Emulsifiers which are inherently present in the dry dough ingredients, such as in the case of the potato flakes, are not included in the term added emulsifier.

A particularly preferred emulsifier composition used for making low-fat snacks comprises three functional components: (1) a monoglyceride component; (2) a polyglycerol ester component; and (3) a fat component.

The monoglyceride component of the emulsifier system is comprised of mono-diglycerides, distilled monoglycerides, or mixtures thereof.

The monoglyceride component is comprised of mono-diglycerides, distilled monoglycerides, or mixtures thereof and may be a mixture of saturated and unsaturated glycerol esters of fatty acids, typically derived from hydrogenated to non-hydrogenated vegetable oils such as soybean oil, corn oil, olive oil, sunflower oil, cottonseed oil, palm oil and like vegetable oils, and animal fats such as tallow and lard. The fatty acid monoglyceride component comprises at least 30% monoglycerides. Preferably, more concentrated mono-diglycerides or distilled monoglycerides are used. The more concentrated mono-diglycerides or distilled monoglycerides comprise at least about 60%, preferably from at least about 70% to at least about 98%, more preferably from at least about 80% to at least about 95%, and most preferably about 90% monoglyceride, with the balance being diglycerides with small amounts of triglyceride and free glycerine. Preferably the amount of free glycerine present in the monoglyceride component is less than about 2.0%.

The monoglyceride component useful in low-fat snacks typically has an iodine value in the range of from about 2 to about 120, preferably from about 20 to about 100, more preferably from about 40 to about 80, and most preferably from about 50 to about 75.

Preferably the mono-diglycerides or distilled monoglycerides have a linolenic fatty acid level of less than 3.5%.

The monoglyceride component comprises from about 2% to about 50%, preferably from about 5% to about 40%, more preferably from about 10% to about 30%, and most preferably from about 12% to about 25%, of the total emulsifier-lipid composition.

The second component of the emulsifier-lipid composition is a polyglycerol ester component. Examples of suitable polyglycerol esters include decaglycerol decaoleate, triglycerol monostearate, octaglycerol monostearate, and octaglycerol mono-palmitate, or mixtures thereof. The polyglycerol esters for use in the present invention are specifically tailored by controlling the hydrophilic-lipophilic balance (HLB) of the polyglycerol esters. This hydrophilic-lipophilic balance of the polyglycerol ester component is important in preparing the polyglycerol ester component for use in sheeted doughs.

The polyglycerol esters suitable for use in the present invention comprise less than 50%, preferably from about 2% to about 40%, and more preferably from about 5.0% to about 25% free glycerine; from about 5% to about 60%, preferably from about 15% to about 50%, more preferably from about 10% to about 45% and most preferably from about 25% to about 40% monoester. The polyglycerol ester component for use in the present invention additionally has from about 2 to about 10 glycerol units per polyglycerol moiety, wherein the glycerol units have less than 40%, preferably from about 20% to about 33%, more preferably from about 18% to about 30% of their hydroxyl groups esterified with myristic acid, palmitic acid, or stearic acid or mixtures thereof.

The polyglycerol ester component comprises from about 0.5% to about 40%, preferably from about 1% to about 35%, more preferably from about 1% to about 30%, and most preferably 2% to about 25% of the total emulsifier-lipid composition.

The third component of the emulsifier-lipid composition is a fat. The terms "fat" and "oil" are used interchangeably herein, unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term. A particularly preferred non-digestible fat suitable for use as the third component of the emulsifer-lipid of the present invention is Olean™, available from The Procter & Gamble Company, Cincinnati, Ohio.

The emulsifier is present in the dough compositions of the present invention in an amount of from about 0.5% to about 15.0% by weight, preferably from about 2.0% to about 8.0%, and more preferably from about 3.0% to about 5.0%.

Additional Ingredients

Other ingredients may be added to the dough compositions of the present invention. These ingredients include, but are not limited to, leavening agents (e.g. sodium bicarbonate, calcium acid pyrophosphate), sugar, vitamins, minerals, salt, oil, and flavoring ingredients. The flavoring ingredients may be blended into the dough composition and/or sprinkled upon the dough composition before frying and/or applied to the product after frying. Flavorings include sweet and savory flavors, for example, barbecue, bacon, spices, herbs. Dry vegetables (e.g. onion, garlic, tomato), dairy (e.g. cheese, sour cream) and mixtures thereof.

The dough of the present invention can be prepared by any suitable method for forming sheetable doughs. Preferably, the lower water absorption index materials are hydrated prior to the addition of the higher water absorption index components (i.e., potato flakes and/or granules). The dough compositions of the present invention can be prepared by thoroughly mixing together the flour component, polysaccharide and emulsifier. Typically, a water pre-blend of any water soluble components, if present,(e.g., sugar, salt, flavoring) is made. The water is then added to the potato flour and/or granules mixture and emulsifier blend and mixed to form a loose, dry dough. Preferred devices for mixing together the dough ingredients are conventional mixers. Hobart® mixers can be used for batch operations and Turbolizer® mixers can be used for continuous mixing operations. However, extruders can also be used to mix the dough and to form the sheets or shaped pieces.

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should be heated from about 90° F. (32° C.) to about 135° F. (57° C.). In a preferred embodiment, the mill rolls are kept at two different temperatures, with the front roller being cooler than the back roller.

Dough compositions of the present invention are usually formed into a sheet having a thickness of from about 0.015 to about 0.10 inches (from about 0.038 to about 0.25 mm), and preferably to a thickness of from about 0.018 to about 0.05 inches (from about 0.4572 to about 1.27 mm), and most preferably from about 0.020 to about 0.023 inches (0.508 to 0.5842 mm). For rippled (wavy shaped) chips, the preferred thickness is about 0.75 inches (1.9 mm). The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described in published PCT application WO 95/07610, Dawes et al., Jan. 25, 1996, which is incorporated by reference.

Snack Preparation

After the snack pieces are formed, they are cooked until crisp. The snack pieces can be cooked by frying, partially frying and then baking, or by partially baking then frying. The snack pieces can be fried in a fat compositions comprising triglycerides, non-digestible fat, or a blend of non-digestible fat and triglyceride fat. The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™.

It is preferred to fry the snack pieces at temperatures of from about 325° F. (162° C.) to about 450° F. (232° C.), preferably from about 350° F. (176° C.) to about 425° F. (218° C.), and more preferably from about 360° F. (182° C.) to about 400° F. (204° C.).

The dough is fried for a time sufficient to form a product having from about 0.5% to about 6.0%, preferably from about 1.0% to about 5.0%, and more preferably from about 2.0% to about 4.0% moisture. The exact frying time is controlled by the temperature of the frying fat, the starting water content of the dough, and the composition of the dough, which can be easily determined by one skilled in the art.

Preferably, the snack pieces are fried in oil using a continuous frying method and are constrained during frying. This constrained frying method and apparatus is described in U.S. Pat. No. 3,626,466 (Liepa, 1971). The shaped, constrained pieces are passed through the frying medium until they are fried to a crisp state with a final moisture content of from about 0.5% to about 4% water, preferably 1% to about 2%.

Continuous frying or batch frying of the snack pieces in a non-constrained mode is also acceptable. In this method the pieces are immersed in the frying fat on a moving belt or basket.

The frying can be done in a fat composition consisting essentially of a non-digestible fat, or, if desired, the frying can be done in a mixture of conventional triglyceride oil and a non-digestible fat such as those described in U.S. Pat. No. 3,600,186 to Mattson et al., issued May 12, 1970; U.S. Pat. No. 4,005,195 to Jandacek, issued Jan. 25, 1977; U.S. Pat. No. 4,005,196 to Jandacek et al., issued Jan. 25, 1977; U.S. Pat. No. 4,034,083 to Mattson, issued Jul. 5, 1977; and U.S. Pat. No. 4,241,054 to Volpenhein et al., issued Dec. 23, 1980, all of which are incorporated by reference.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to about 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans-isomers, and can be the same for all ester groups, or can be mixtures of different fatty acids.

Liquid non-digestible oils can also be used in the practice of the present invention. Liquid non-digestible oils having a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Coming). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995, describes mixtures of reduced calorie triglycerides and polyol polyesters that can be used herein but which provides more digestible fat than is typically preferred.

The preferred non-digesitible fats are fatty materials having properties similar to triglycerides such as sucrose polyesters. OLEAN™, a preferred non-digestible fat, is made by The Procter and Gamble Company. These preferred non-digestible fats are described in Young et al., U.S. Pat. No. 5,085,884, issued Feb. 4, 1992, and U.S. Pat. 5,422,131, issued Jun. 6, 1995 to Elsen et al.

Other ingredients known in the art can also be added to the edible fats and oils, including antioxidants such as TBHQ, ascorbic acid, chelating agents such as citric acid, and anti-foaming agents such as dimethylpolysiloxane.

Final Snack Properties

The organoleptical properties of the finished snack can be selectively controlled. For example, if a harder product is desired, one may add, for example, starch octenylesuccinate or cellulose derivative to a potato-based formula. If a softer product is desired, hydroxypropyl waxy corn starch may be added.

One test which indicates the amount of force needed to break a product is the Flexure Strength Test described herein. The area ( i.e., work applied to break the product) is used to indicate the hardness of the product. As used herein "flexure strength" refers to the force needed to break the product.

The preferred products require a work input of from about 30 g/mm to about 265 g/mm, preferably from about 50 g/mm to about 235 g/mm, and more preferably from about 70 g/mm to about 147 g/mm, and most preferably from about 90 g/mm to about 130 g/mm.

Analytical Methods

Tensile Strength Test

The tensile test is a measurement of the peak tension force and the elastic modulus of a sheet strip. The tensile strength is read as the maximum peak force (gf) of a graph obtained from force against distance. This test is designed to measure the strength, elasticity and extensibility of the dough sheet. The tensile strength is an average of 5–10 repetitions of each test.

This test is conducted using a Texture Analyzer (TA-XT2) from Texture Technologies Corp. This equipment uses software called XT.RA Dimensions. This test utilizes 2 parallel friction rollers with a distance between the upper and lower rig arms set at 6 cm.

The sheet is cut into a strip 3 cm in width by 60 cm in length. The bottom of the sheet strip is placed into the lower rig arm slot that is attached to the test bed. The strip is wound 5 revolutions and tightened enough to hold the strip. The top part of the sheet strip is attached to a similar rig slot in a upper arm that is attached to the load cell in the front of the probe carrier. Once the dough is taut between the rig arms, the measurement is begun by moving the rig arms upward at a preset fixed rate 10 mm/sec and set to travel 75 mm. Once the 5 gram trigger force is attained the graph proceeds to plot the effect on the dough sheet under tension. When the elastic limit is exceeded, the dough strip breaks. The maximum peak force is recorded.

Sheet Strength Test

The sheet strength test is a puncture test. Sheet strength is the measurement of the force needed to break a dough sheet having a thickness of from about 0.50–0.64 mm. The sheet strength is read as the maximum peak force (gf) of a graph obtained from force against distance. The test is designed to measure potato dough sheet strength. All products are tested at room temperature. Sheet strength is an average of ten repetitions of each test. The sheet strength is measured by preparing a 3 kilogram batch of dough.

The dough is made in a small Hobart® mixer at low speed for 1.0–1.5 minutes. After mixing, the dough is sheeted using a conventional milling machine with conventional mill rolls.

This test is conducted using a Texture Analyzer (TA-XT2) from Texture Technologies Corp. This equipment uses a software called XTRAD. This test utilizes a 7/16" diameter acrylic cylinder probe (TA-108), which has a smooth edge to minimize any cutting of the dough sheet. The dough sheet is held between two aluminum plates (10×10 cm). The aluminum plates have a 7 cm diameter opening in the center. Through this opening the probe makes contact with the sheet and pushes it downwards until it breaks. These plates have an opening in each corner to hold the sheet dough in place. Each dough sheet is pre-punched with holes to fit over the alignment pins at the corners of the plate and cut to the size (10×10 cm) of the plate. This provides uniform tension as the probe moves down and through the sheet. The probe travels at 2.0 mm/second until the dough sheet surface is detected at 20 grams of force. The probe then travels at 1.0 mm/second for up to 50 mm, a distance chosen to stretch the dough sheet until it thoroughly ruptures. The probe withdraws at 10.0 mm/second. The probe is run in a "Force vs. Compression" mode, which means the probe will move downward measuring the force.

Flexure Strength Test

The flexure strength is a measurement of the force needed to break a finished product. The flexure strength is read as the maximum peak force (gf) of a graph obtained from force against distance. The test is designed to measure the hardness of a finished product. Flexure strength is an average of 10 repetitions of each test. The area under the peak correlates with the amount of force needed to break the finished product.

This test is conducted using a Texture Analyzer (TA-XT2) from Texture Technologies Corp. This equipment uses a software called XTRAD. This test utilizes a knife blade with a sharp 45° chisel end (TA-42), which has a smooth edge. The product (saddle shaped, hyperbolic paraboloid) is rested on a platform with a 2 cm×10 cm slot in the middle so that the probe is directly above the product. Once lowered, the knife blade touches every point on y=x straight line of the product.

The probe travels at 5.0 mm/second until a force of 15 grams is detected. The probe then travels at 1.5 mm/second until the product breaks. The probe is withdrawn at 10.0 mm/second. The maximum peak force (the flexure strength) and area under the curve (work applied to break the product) are recorded.

The following examples illustrate the invention in more detail but are not meant to be limiting thereof.

EXAMPLE 1

The following ingredients are combined in the manner described below to a snack of the present invention.

| DRY MIX | |
|---|---|
| Ingredient | Wt. % |
| Flour | 76 |
| *Polysaccharide | 24 |
| Total | 100.0 |

*the polysaccharide is a blend of a hydrolyzed starch, waxy corn, pregelatinized wheat, and a pregelatinized corn.

A dough is made by blending 68% of the dry mix, 31% water, and 1% emulsifier in a Hobart® mixer to form a loose, dry dough (1.0–1.5 minutes). The dough is sheeted by continuously feeding it through a pair of sheeting rolls, forming an elastic, continuous sheet without pin holes. The dough has a tensile strength of 234 g. Sheet thickness is controlled to 0.02 inches (0.05 cm). The front roll is heated to about 90° F. (32° C.) and the back roll is heated to about 135° F. (57° C.). The dough sheet is then cut into oval shaped pieces and fried in a constrained frying mold at 385° F. (196° C.) for about 12 seconds. The product is held in the molds for about 20 seconds to allow the oil to drain. The amount of work needed to break the snack is 166 g/mm.

EXAMPLE 2

A mix containing 68% of the dry mix, 31% water, and 1% emulsifier are combined in the manner described in Example 1 to form a snack of the present invention. The dough has a tensile strength of 321 g.

| DRY MIX | |
|---|---|
| Ingredient | Wt. % |
| ¹Flour | 85 |
| ²Polysaccharide | 15 |
| Total | 100.0 |

¹Combination of potato flakes and granules
²Combination of hydrolyzed starch and ungelatinized hydroxypropyl crosslinked waxy corn starch.

EXAMPLE 3

To determine the unique properties of various ingredients, the procedure and formulation of Example 2 are repeated several times, replacing the ungelatinized hydroxypropyl crosslinked waxy corn starch with the following starches: (A) waxy corn, (B) peracetylated crosslinked starch, and (C) crosslinked potato starch. The amount and type of hydrolyzed starch in the polysaccharide component remains the same and the same total polysaccharide level (15%) is maintained. The formulas and results are shown in Table 1.

TABLE 1

| INGREDIENT | A | B | C |
|---|---|---|---|
| Flour Component | 85 | 85 | 85 |
| Waxy Corn/Starch hydrolyzate | 15 | — | — |
| Peracetylated Crosslinked Starch/Starch hydrolyzate | — | 15 | — |
| Crosslinked Potato Starch/Starch hydrolyzate | — | — | 15 |
| Tensile Strength (g) | 330 | 142 | 174 |

Replacing the ungelatinized hydroxypropyl crosslinked waxy corn starch with a waxy corn starch results in a product (A) that has less expansion, has less crispness, and has a slower mouthmelt than the product containing the hydroxypropyl crosslinked waxy corn starch (Example 2). Product A also has less potato chip flavor and less fried flavor than the product of Example 2.

When peracetylated crosslinked starch replaces the hydroxypropyl crosslinked waxy corn starch, the resulting product (B) is slightly harder than product (A) and the product of Example 2. The product of (B) is also less crispy, has a slower mouthmelt, and is gummier than either product A or Example 2.

Replacing the hydroxypropyl crosslinked waxy corn with a crosslinked potato starch results in, a product (C) that is less expanded and harder than any of the previous products (Example 2, A, or B) and a product that is less crispy than Example 2 and A.

What is claimed is:

1. A dough composition comprising from about 55% to about 75% of a dry mix and from about 25% to about 45% added water wherein said dry mix comprises:
   (a) from about 51% to about 95% of a potato-based component selected from the group consisting of potato flour, potato granules, potato flakes, and mixtures thereof, and
   (b) at least about 5.0% of a polysaccharide, wherein said polysaccharide comprises a gum selected from the group consisting of hydroxypropylcellulose, hydroxypropylmethylcellulose, gellan gum, gum arabic, pectic acid and mixtures thereof.

2. The dough composition of claim 1, wherein said gum is present in the dry mix at a level of up to about 10%.

3. The dough composition of claim 2, wherein said gum comprises hydroxypropylcellulose.

4. The dough composition of claim 2, wherein said gum comprises hydroxypropylmethylcellulose.

5. The dough composition of claim 2, wherein said gum comprises gellan gum.

6. The dough composition of claim 2, wherein said gum comprises gum arabic.

7. The dough composition of claim 2, wherein said gum comprises pectic acid.

8. A dough composition comprising from about 55% to about 75% of a dry mix and from about 25% to about 45% added water wherein said dry mix comprises:

(a) from about 51% to about 95% of a potato-based component selected from the group consisting of potato flour, potato granules, potato flakes, and mixtures thereof; and (b) at least about 5.0% of a polysaccharide, wherein said polysaccharide comprises a modified starch selected from the group consisting of hydroxyalkylated starch, hydroxypropylated starch, stabilized starch, starch ester, starch ether, starch acetate, starch octenyl succinate, peracetylated starch, pregelatinized cross-linked hydroxypropylated pregelatinized starch, hydroxypropyl cross-linked starch, peracetylated cross-linked starch, peracetylated cross-linked potato starch, cross-linked starch, pregelatinized cross-linked starch, cross-linked potato starch, ungelatinized hydroxypropyl cross-linked waxy corn starch, and mixtures thereof.

9. The dough composition of claim 8, wherein said modified starch comprises hydroxyalkylated starch at a level of up to about 15% in the dry mix.

10. The dough composition of claim 8, wherein said modified starch comprises peracetylated starch at a level of up to about 15% in the dry mix.

11. The dough composition of claim 8, wherein said modified starch comprises starch octenyl succinate at a level of up to about 15% in the dry mix.

12. The dough composition of claim 8, wherein said modified starch comprises hydroxypropylated starch at a level of up to about 15% in the dry mix.

13. The dough composition of claim 8, wherein said modified starch comprises pregelatinized cross-linked hydroxypropylated pregelatinized starch at a level of up to about 15% in the dry mix.

14. The dough composition of claim 8, wherein said modified starch comprises hydroxypropyl cross-linked starch at a level of up to about 15% in the dry mix.

15. The dough composition of claim 8, wherein said modified starch comprises peracetylated cross-linked starch at a level of up to about 15% in the dry mix.

16. The dough composition of claim 8, wherein said modified starch comprises peracetylated cross-linked potato starch at a level of up to about 15% in the dry mix.

17. The dough composition of claim 8, wherein said modified starch comprises ungelatinized hydroxypropyl cross-linked waxy corn starch at a level of up to about 15% in the dry mix.

18. The dough composition of claim 8, wherein said modified starch comprises stabilized starch.

19. The dough composition of claim 8, wherein said modified starch comprises starch ester.

20. The dough composition of claim 8, wherein said modified starch comprises starch ether.

21. The dough composition of claim 8, wherein said modified starch comprises starch acetate.

22. The dough composition of claim 8, wherein said modified starch comprises cross-linked starch.

23. The dough composition of claim 8, wherein said modified starch comprises pregelatinized cross-linked starch.

24. The dough composition of claim 8, wherein said modified starch comprises cross-linked potato starch.

* * * * *